G. C. JENSEN.
DEVICE FOR LOCKING LEVERS.
APPLICATION FILED FEB. 13, 1918.
1,290,751.
Patented Jan. 7, 1919.
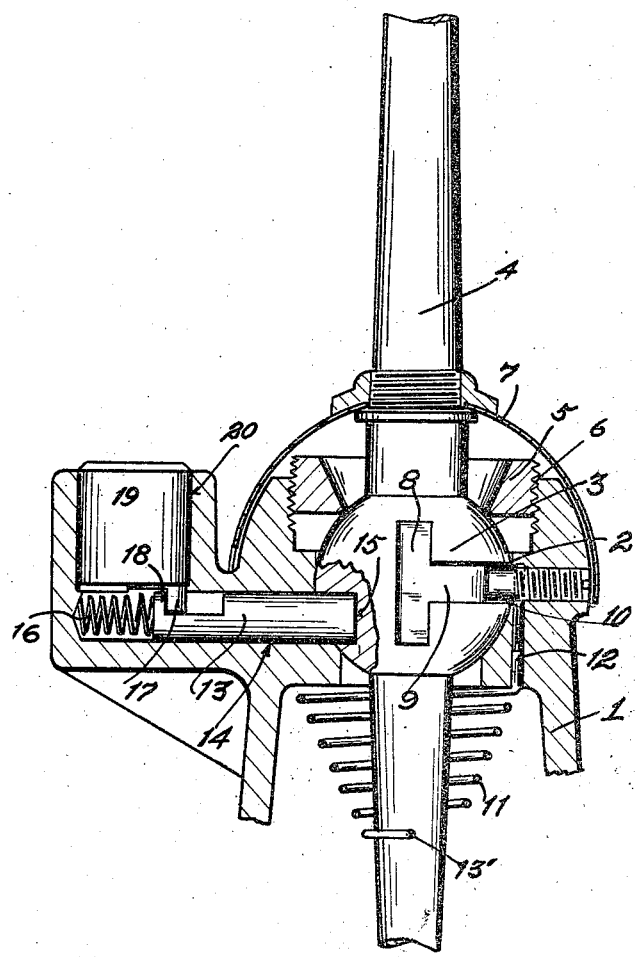

UNITED STATES PATENT OFFICE.

GEORGE C. JENSEN, OF OAKLAND, CALIFORNIA.

DEVICE FOR LOCKING LEVERS.

1,290,751.    Specification of Letters Patent.    Patented Jan. 7, 1919.

Application filed February 12, 1918. Serial No. 216,961.

*To all whom it may concern:*

Be it known that I, GEORGE C. JENSEN, a citizen of the United States, residing at Oakland, in the county of Alameda and State of California, have invented certain new and useful Improvements in Devices for Locking Levers, of which the following is a specification.

In the present invention a mechanism designed for locking a lever wherein the lever is capable of universal swinging movement and axial rotation is provided.

The invention has for its principal objects to provide a construction wherein a lock controlled mechanism is included and which when released permits of axial rotation of the lever to a position to admit of universal movement of the same in its fulcrum, and when it is desired to lock the lever from movement, said lock controlled mechanism will engage and hold the lever from movement on the axial rotation thereof.

To more fully comprehend the invention reference is directed to the accompanying drawing wherein the figure illustrates a vertical sectional view of the preferred embodiment of my invention with the lever rotated to locked position.

Referring more particularly to the drawing, 1 indicates a suitable tubular support provided with a spherical seat or socket 2 in which is received the spherical fulcrum portion 3 of a lever 4, of any well known type. The lever is capable of universal swinging movement within the socket 2 and is held therein by a suitable retaining ring 5 having threaded engagement, as at 6, with the upper portion of the tubular support 1. A suitable shell 7 carried by the lever above the spherical fulcrum 3 and extending downwardly over the sides of the upper end of the tubular support 1, incloses the ring 5 and excludes dust and grit from the spherical portion of the lever. The spherical fulcrum portion 3 is provided in its surface with a vertical slot 8, communicating with one side of which is a horizontal slot 9, and projecting into said slot 9 is a pin 10 carried by the tubular support 1 and projecting beyond the inner face of the socket 2 thereof. The pin 10 when the lever 4 is axially rotated to position the slot 8 to coöperate therewith, slides into slot 8 and permits universal swinging movement of the lever, and when said lever is axially rotated to position the pin 10 into the slot 9, said pin limits the axial rotation of the lever.

A coiled spring 11 secured at one end, as at 12, to the tubular support 1 and at its opposite end, as at 13, to the lever below the spherical portion 3, axially rotates the lever from the position as in the drawing to cause the slot 8 to register with the pin 10.

A horizontally disposed locking bolt 13 is slidably mounted in a guide 14 to communicate with the spherical socket 2, and the outer end of said bolt is adapted for reception within a seat 15 in the spherical fulcrum portion 3 of the lever, at such time as the lever is axially rotated to the position as in the drawing, said bolt locking the lever from axial rotation and thus preventing the coöperation of the pin 10 and slot 8, which admits of universal swinging movement of the lever.

A coiled spring 16 abutting against the outer end of the locking bolt 13 normally forces the same outwardly and said locking bolt is released by an eccentrically mounted finger 17 carried on the underside of a rotatable key controlled barrel 18 mounted in a lock cylinder 19 positioned within a bore 20 at one side of the tubular support 1.

It will be apparent that on the withdrawal of the locking bolt 13 from the recess 15, the spring 11 will automatically rotate the lever 4 from the position as in the drawing to cause the slot 8 to register with the pin 10, permitting universal movement of the lever in its socket, and that when it is desired to lock the lever from movement the same may be axially rotated by manual movement which will cause the withdrawal of the pin 10 from slot 8 and cause the slot 9 to register therewith, and on the pin 10 contacting with the rear end of the slot 9 the locking bolt 13 will automatically be seated by the action of the spring 16 in the recess 15, the pin 10 coöperating with the slot 9 and the locking bolt 13 coöperating with the seat 15, locking said lever from operative movement within its socket or removal therefrom.

Having thus described my invention, what I claim as new and desire to protect by Letters Patent is:—

1. In combination with a lever formed within its length with a spherical fulcrum portion, a tubular support for said lever and provided with a socket for receiving said spherical portion, said lever capable of universal swinging movement within said socket and of axial rotation therein to permit of operative swinging movement thereof, said spherical portion provided with intersecting horizontal and vertical guide slots, a pin carried by said support and coöperating with said slots, and a lock controlled locking bolt carried by said support for engaging and locking said lever from axial rotation and when said pin is received in said horizontal slot.

2. In combination with a lever formed within its length with a spherical fulcrum portion, a tubular support for said lever and provided with a socket for receiving said spherical portion, said lever capable of universal swinging movement within said socket and of axial rotation therein to permit of operative swinging movement thereof, said spherical portion provided with intersecting horizontal and vertical guide slots, a pin carried by said support and coöperating with said slots, a lock controlled locking bolt carried by said support for engaging and locking said lever from axial rotation and when said pin is received in said horizontal slot, and means for automatically rotating said lever on the release of said locking bolt to position said vertical slot in coöperative relation with said pin.

3. In combination with a lever fulcrumed for universal swinging movement and capable of axial rotation to permit of operative swinging movement thereof, of means for guiding the lever in its axial rotation and swinging movement, a spring pressed locking bolt for automatically engaging and locking said lever from movement on the axial rotation of the same from operative position, and lock controlled means for releasing said bolt from locked engagement with the lever.

4. In combination with a lever fulcrumed for universal swinging movement and capable of axial rotation to permit of operative swinging movement thereof, a spring pressed locking bolt for automatically locking said lever from movement on the axial rotation of the same from operative position, a lock controlled means associated with and capable of operation for withdrawing said bolt from locked engagement with the lever, and means for automatically axially rotating said lever to operative position on the release of said locking bolt.

In testimony whereof I have signed my name to this specification in the presence of two subscribing witnesses.

GEORGE C. JENSEN.

Witnesses:
HARRY A. TOTTEN,
D. B. RICHARDS.